Nov. 15, 1938.  J. R. FREEZE  2,136,942
METHOD AND APPARATUS FOR MAKING HELICAL LOCK SEAM CULVERTS
Filed Oct. 23, 1934  7 Sheets-Sheet 1

INVENTOR.
JONATHAN ROY FREEZE.
ATTORNEYS.

Nov. 15, 1938.    J. R. FREEZE    2,136,942
METHOD AND APPARATUS FOR MAKING HELICAL LOCK SEAM CULVERTS
Filed Oct. 23, 1934    7 Sheets-Sheet 2
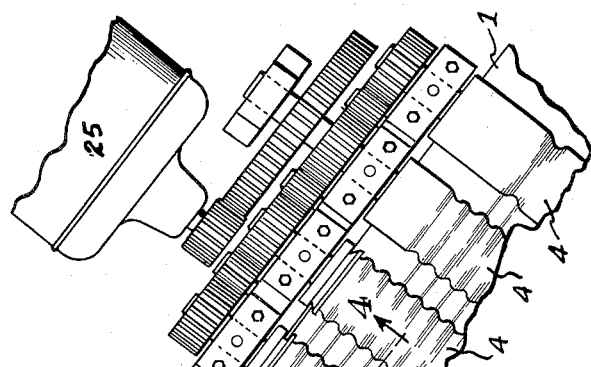
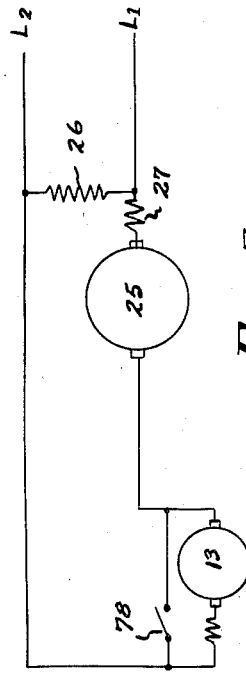
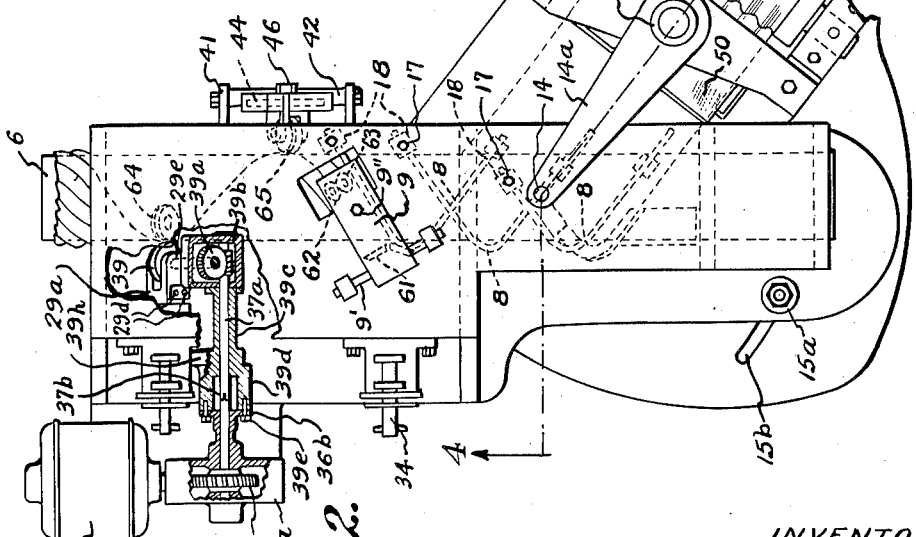
INVENTOR.
JONATHAN ROY FREEZE.
ATTORNEYS.

Nov. 15, 1938.   J. R. FREEZE   2,136,942
METHOD AND APPARATUS FOR MAKING HELICAL LOCK SEAM CULVERTS
Filed Oct. 23, 1934   7 Sheets-Sheet 3

INVENTOR.
JONATHAN ROY FREEZE.
ATTORNEYS.

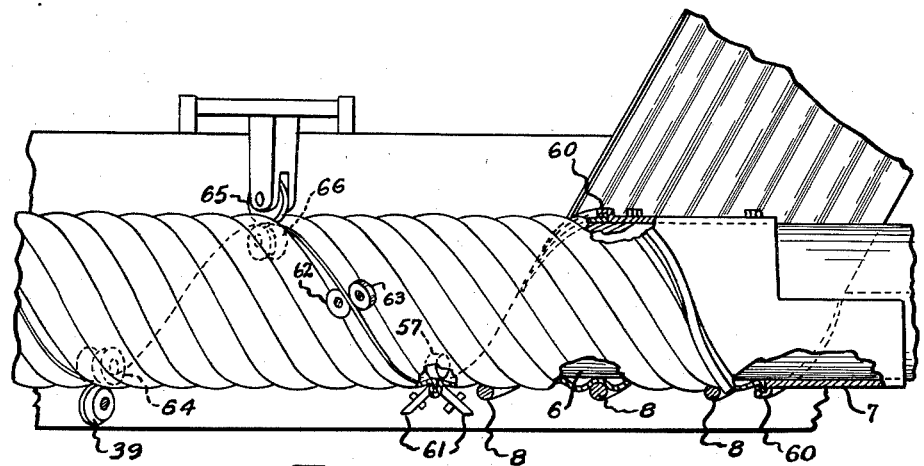

Nov. 15, 1938. J. R. FREEZE 2,136,942
METHOD AND APPARATUS FOR MAKING HELICAL LOCK SEAM CULVERTS
Filed Oct. 23, 1934 7 Sheets-Sheet 5

INVENTOR.
JONATHAN ROY FREEZE.
BY
ATTORNEYS.

Nov. 15, 1938.　　　　J. R. FREEZE　　　　2,136,942
METHOD AND APPARATUS FOR MAKING HELICAL LOCK SEAM CULVERTS
Filed Oct. 23, 1934　　　7 Sheets-Sheet 6

INVENTOR.
JONATHAN ROY FREEZE.
BY *Allen & Allen*
ATTORNEYS.

Nov. 15, 1938.  J. R. FREEZE  2,136,942
METHOD AND APPARATUS FOR MAKING HELICAL LOCK SEAM CULVERTS
Filed Oct. 23, 1934  7 Sheets-Sheet 7

INVENTOR.
JONATHAN ROY FREEZE
BY Allen & Allen
ATTORNEYS.

Patented Nov. 15, 1938

2,136,942

UNITED STATES PATENT OFFICE 2,136,942

METHOD AND APPARATUS FOR MAKING HELICAL LOCK SEAM CULVERTS

Jonathan Roy Freeze, Middletown, Ohio, assignor to The American Rolling Mill Company, Middletown, Ohio, a corporation of Ohio Application October 23, 1934, Serial No. 749,579

18 Claims. (Cl. 113—35)

My invention relates to helical lock seam culverts, and comprises a method of producing the same, and a machine for carrying out my novel method. Helical lock seam culvert and helical lock seam pipe have both been suggested hitherto. Both were to be formed of a strip of metal disposed helically to form a cylinder, the meeting edges of the strip being joined by a crimped lock seam. The culvert is to be distinguished from the pipe in that the former is formed of a corrugated strip, and is therefore corrugated in its final form.

Considerable difficulties have attended attempts to manufacture such articles, largely for reasons which I shall hereinafter make clear. So far as I am aware helical lock seam culvert has not hitherto been produced commercially.

I have succeeded in developing a method and a machine for producing this product on a commercial scale. My method results in continuous production, and my machine employs a simple mechanism to perform the manufacturing operations, and minimizes reliance on the human element. Past attempts at commercial production of helical lock seam pipe or culvert have been characterized, uniformly as far as I am aware, by internal sizing. This characteristic of previous methods has necessitated axial movement as well as rotative movement of the arbor. Furthermore, since the arbor had to be contracted and returned at intervals, intermittent production resulted.

The seaming operation has always been a source of trouble; seams were irregular because of improper locking. This was due to a number of factors. Variations in strip width, unevenness of temper, and camber in the strip, either affected the meeting of the parts to be joined or caused the entire seam to vary its position axially of the pipe so that the locking means could not properly contact it. The improper locking was exaggerated also, I believe, by the fact that the flattening and inclining operations were intended to be conducted simultaneously, whereby a seam was inclined before the parts were properly engaged. The other difficulties were the result of rigidity of the various apparatus.

It is desirable that machines for forming helical lock seam pipe be capable of manufacturing pipe of diameters over a considerable range; but this must not mean that the machines become cumbersome and complicated, and subject to many mechanical ailments. Furthermore, in supplying a low priced product, it is of paramount importance that the "set up time" be reduced to a minimum.

With the above and other difficulties in view, it is an object of my invention to provide a method of continuously forming helical, flat or corrugated lock seam pipe or culvert, and to provide a machine for carrying out that method. It is another object of my invention to provide means for externally sizing the tube, whereby the necessity of complicated mechanisms inside the tube is obviated, and mechanical adjustments are rendered accessible externally. Further, it is an object of my invention to provide means for forming the seams, whereby the lock is perfect before the inclining operation takes place. It is my object to provide a method and machine for the perfect formation of the lock in spite of the variations pointed out above. Again, it is my object to provide a machine in which the seaming operation is accomplished progressively by flexibly mounted rolls, the first of these being most flexible, and the last being less so or even rigid, and the intermediate ones varying from the one extreme to the other in gradual steps. Still further it is my object to provide a "single-purpose-unit", which is designed to form a single diameter of pipe, and an "all-purpose" base upon which "single-purpose-units" for various sizes may be mounted interchangeably in such a way that the act of mounting automatically locates the units in operative position.

These and other objects of my invention which will be set forth hereinafter, or will be apparent to one skilled in the art upon reading these specifications, I accomplish by that certain method, and that certain construction and arrangement of parts of which I shall now describe a preferred embodiment.

Reference is made to the accompanying drawings, and in which:

Fig. 2 is a fragmentary plan view of the machine with parts broken away and certain parts in section.

Fig. 3 is a wiring diagram of the motors.

Fig. 7 is a general plan view with parts broken away, of the mandrel and the pipe being formed thereabout, showing the position of the rollers for the seaming operations, certain of the mountings and the like being omitted for clarity.

Fig. 8 is a sectional view showing the mounting of the rollers used in the first seaming operation.

Fig. 9 is a sectional view showing the mounting of the outer roller used in the final seaming operation.

Fig. 10 is a sectional view illustrating one method of driving the final seaming roller.

Fig. 11 is a sectional view, somewhat diagrammatic, showing an alternative means for driving the final seaming roller.

Briefly, my method comprises drawing strip continuously from a coil, corrugating the strip, progressively outward from the center toward the edges, forming a U shaped bead along one edge and an L shaped flange along the other, bending the corrugated and flanged sheet and leading the L shaped flange into engagement with the U shaped bead, thereby forming an external helical seam, locking the bead and flange tightly, and then progressively inclining the seam and finally setting the seam solidly home. Other and ancillary steps in my process will be clear from what follows.

It is, of course, within the scope of my invention to waterproof the seam by tinning or sweat-soldering, resistance welding, brazing, or by the use of some plastic material such as an asphaltic compound, or an impregnated ribbon of some sort. In addition, the edges of the sheet may be annealed by heat applied anywhere along the line, before or after the corrugation, or after any of the seaming operations. This practice may be necessary where hard skelp is used, as the severe bends made in the seaming may cause cracking.

Figure 5:
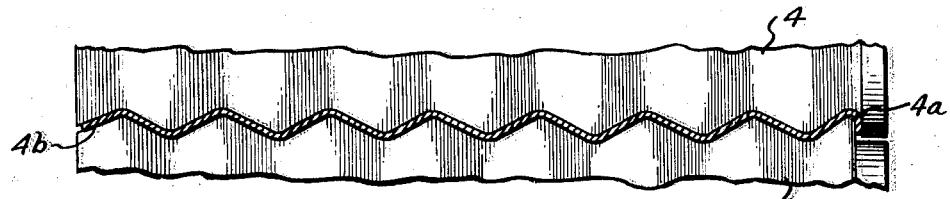
Fig. 5 is a fragmentary sectional view taken through the strip, showing the partial formation of the L shaped flange and the U shaped bead as the strip passes from certain intermediate corrugating rolls.
Figure 6:
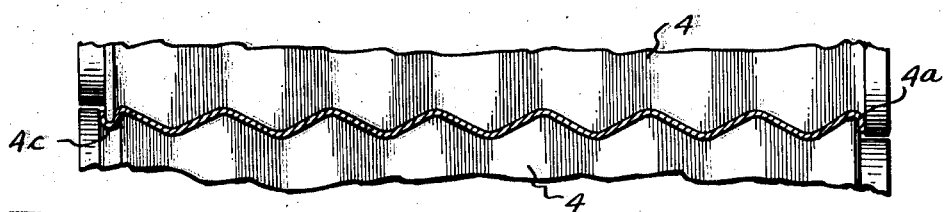
Fig. 6 is a similar fragmentary section through the strip showing the completed formation of the flange and bead as the strip passes from the final corrugating rolls.
Figure 12:
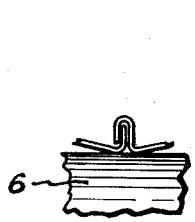
Figs. 12, 13, 14, 15 and 16 show consecutive steps in the seam forming operation, and the rollers used therein.
Figure 13:
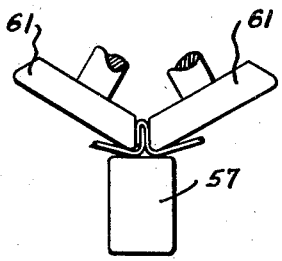

Turning now to a consideration of the machine for carrying out my method, I provide a main support 2, (in Figure 1) upon which are mounted the corrugating rollers 4. The lower of these rollers are immovably mounted with respect to the support 2, but the upper rollers are mounted in movable cross head guides 5, in order to provide for setting them for materials of different thicknesses. A coil of strip is shown at 1, rotatably mounted upon convenient supports 1a for feeding into the corrugating rolls. I have illustrated a sequence for progressive corrugations, aforementioned, in Fig. 2 where I have shown the first roll producing but one central corrugation, the second roll producing 5 corrugations and the third and fourth rolls completing the corrugations, but I do not want to be understood as in anyway limiting my invention by the illustrated sequence. The corrugating rolls 4 are driven through suitable gearing by the motor 25. The L shaped flange and the U shaped bead are also formed during this phase of the process. In Fig. 6 it will be noted that the flange is turned down at 4a, and the preliminary formation of the bead is progressing at 4b. In Fig. 6 the bead is complete as shown at 4c. The rolls shown in Fig. 6 are the last pair before the stock enters the mandrel portion of the machine, while the rolls of Fig. 5 may be the ones mediately or immediately preceding those of Fig. 6. As shown in these figures, I prefer to complete the formation of the flange before commencing on the bead, or vice versa, rather than to attempt to form both coincidently, although this forms no limitation upon my invention. Of course the bead and flange may be formed progressively over three or more sets of rolls, if desired.

It will be noted that the whole forming and seaming assembly which will next be described, is pivoted to the frame or base 2 on pins shown at 14 and 15. This pivot axis is determined by the intersection of vertical planes through the center line of the corrugated strip and through the central axis of the mandrel, for reasons which will be discussed below. A nut and bolt 15a in a part of the forming assembly, riding in a segmental slot 15b in the base, serves to clamp the assembly at any desired angle in order to produce pipe of any diameter. In order to vary the angularity of the mandrel appropriate to a change in the setup from one size of pipe to another, it is only necessary to replace the mandrel 6 by a mandrel of the desired diameter, and loosen the nut 15a so as to swing the assembly to the appropriate angle. The angle of the seaming assembly may be calibrated on the machine directly in pipe diameters, rather than in helical angles, in order to obviate all involved calculations on the job in setting up.

The forming assembly comprises a base member 67 pivoted as aforesaid and an upper frame member 68 to which the mandrel and other forming and seam-making means are mounted. It is therefore convenient to provide one base member 67, and as many of the frame members 68 as there are sizes of pipe to be made. Each of these frame members carries its mandrel and the rod-like forming means; and may also carry the seam forming rollers, though it is commercially possible to provide a set of these rollers, and their mounting means, and their drives where required, and mount these to whatever frame member is chosen.

The pin 14 operates in an arm 14a the other end of which is perforated and engaged over a shaft 14b of sufficient height to take care of the highest of the upper frame members 68.

Figure 1:
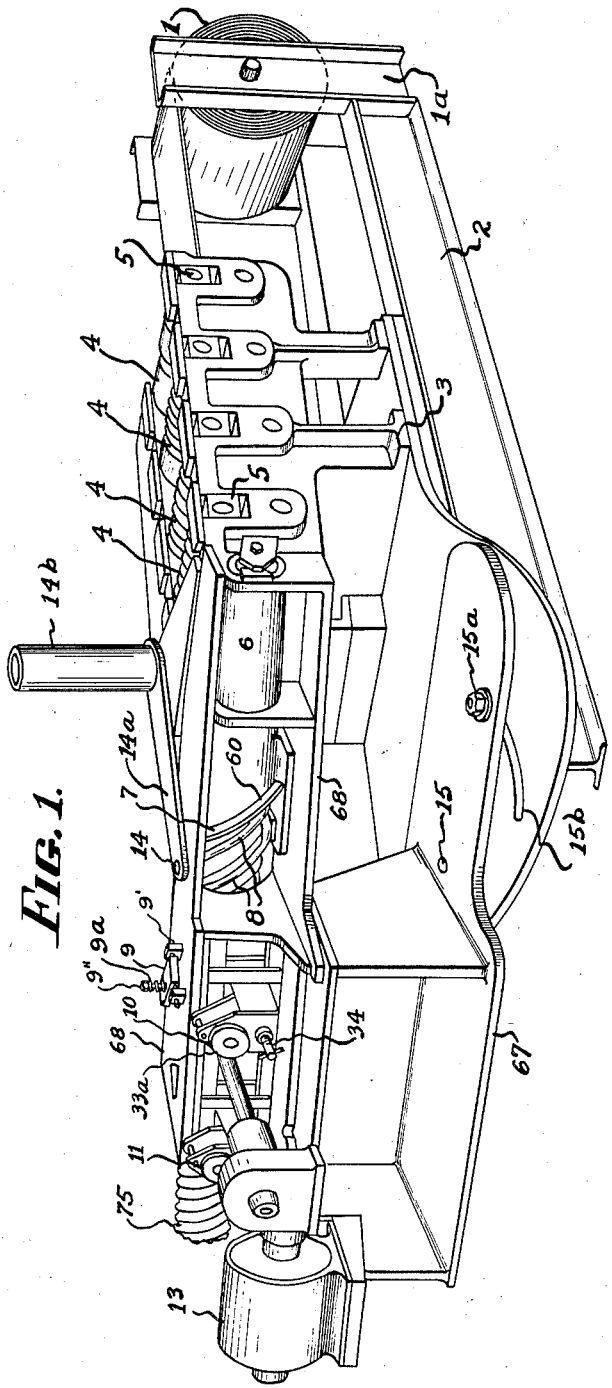
Fig. 1 is a perspective view of my machine.

The mandrel 6 is mounted at its end in the frame as shown in Figure 1, and, of course, is interchangeable with mandrels of varying diameters. A flange guide 7 and helical rods 8, the latter best seen in Figure 2, serve to guide the corrugated sheet around the mandrel. The forming rods 8 have welded thereto near each end, blocks 18 which are anchored to the mandrel holding frame by cap-screws. The guide 7 (Fig. 7), has formed therein a helical channel 60, which serves to guide the L shaped flange into engagement with the U shaped bead as the material passes around the said mandrel.

Figure 4:
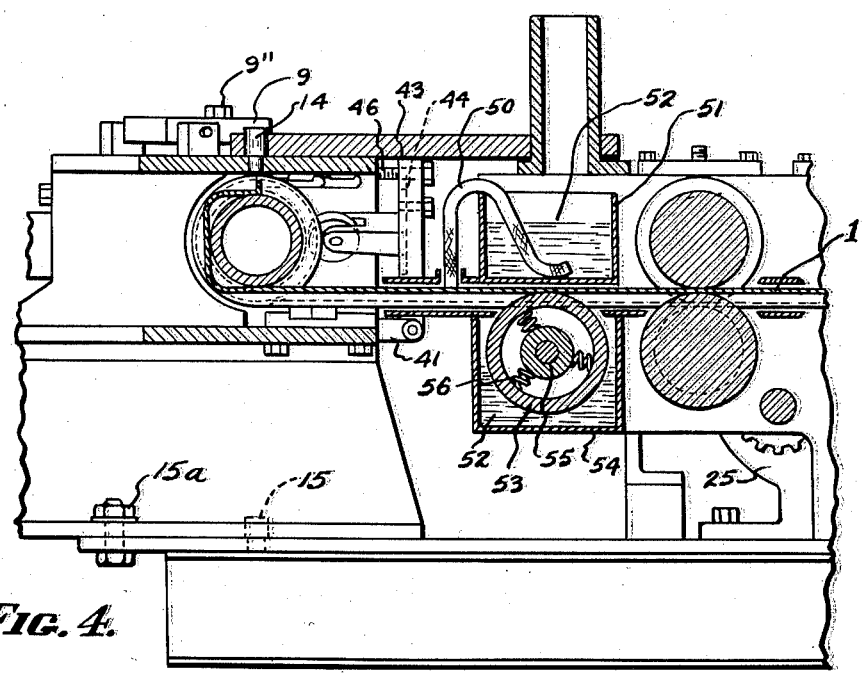
Fig. 4 is a fragmentary sectional view taken on the line 4—4 of Fig. 2.

The mechanisms for lubricating the formed corrugated sheet stock are clearly shown in Figure 4. The upper side of the sheet, or the side which will be adjacent to the mandrel, is lubricated by means of a wick 50 of sheet width which dips into a tank or receptacle 51, containing a suitable lubricant 52. The lower side of the sheet is lubricated by means of a corrugated lubricating roller 53 of sheet width, which rotates in a tank 54 containing more of the lubricant 52. The flexible wick will take care of irregularities in the sheet on the upper surface, and in order that the lower side may likewise be thoroughly lubricated in spite of irregularities, the rim 53 of the lubricating roller is interspaced from the bushing 55 by means of springs 56. By the means above described, a thorough lubrication of both sides of the sheet is insured.

Figure 25:
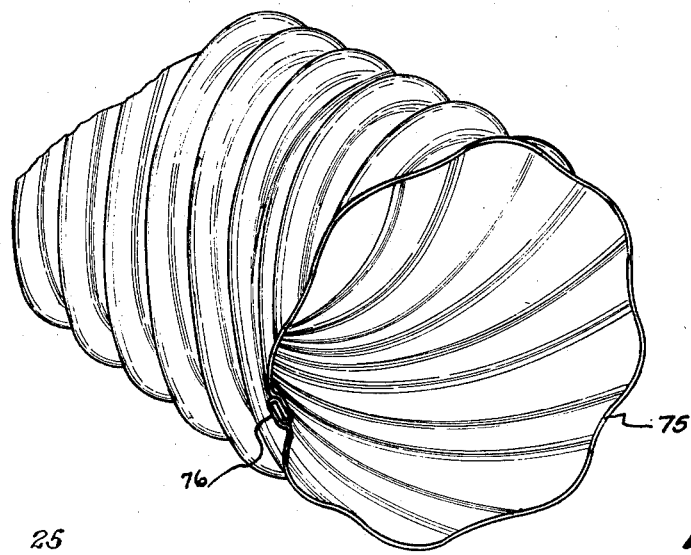
Fig. 25 is a fragmentary section taken along line 25—25 of Fig. 24.
Figure 24:
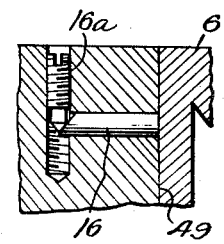
Fig. 24 is a plan view of a holdout roller.
Figure 23:
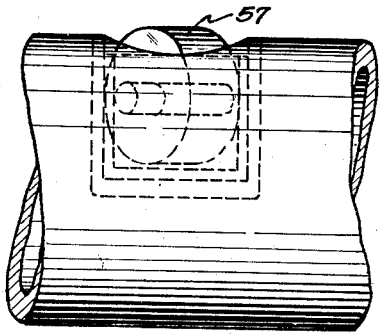
Fig. 23 is a fragmentary side elevation of the mandrel showing the mounting of a holdout roller.
Figure 22:
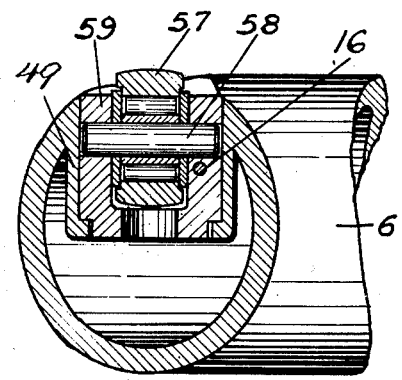
Fig. 22 is a sectional view through the mandrel showing in section the mounting of a holdout roll therein.

The inner, or holdout rollers 57 and 57a, used in conjunction with the first and second seaming operations are mounted within the mandrel itself, as shown in Figures 22, 23 and 24. The inner or holdout rollers 66 and 64, for the third and fourth seaming operations, are similarly mounted. All of these inner rollers are rotatably mounted for angular adjustment in the mandrel, in order to be accurately adjusted to the proper angle required by the particular diameter of pipe being made. These rollers are rotatably mounted upon shafts 58, which have their bearings in boxes 59, which boxes are circular and fit into circular recesses 49, in the mandrel 6. The rollers may be locked in any desired angular position by means of wedge pins 16. As seen in Fig. 25 the wedge pin 16 has an inclined inner end which is contacted by a cone shaped point on the set-screw 16a. Tightening the set-screw 16a thus wedges the pin 16 firmly against the wall of recess 49, locking the roller assembly in position.

Figure 14:
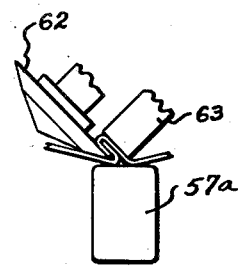

All the forming rollers, referring to Fig. 2, except the last set and the internal holdout rollers, have flexible mountings. The rollers 62 and 63, 65 and 66 for the second and third forming operations respectively, automatically set themselves at the proper angle by virtue of their rotatable mounting aforesaid, and their form is that shown in Figs. 14 and 15 respectively. The forming rollers 61, and 39 and 64 for the first and fourth forming operations respectively, may be set at the proper angle according to a dial graduated in pipe diameters directly, rather than in helical angles.

The set up of the outer rollers 61 for the first operation is shown in detail in Fig. 8. A tube 26 having bolt flanges 28a carries within it rotatably a cartridge-like member 29. Spring members 30 are secured in the slots 31 of the cartridge. A block 31a may be provided to obtain a restrained action of the springs 30. On the end of the cartridge 29 is mounted a gear 32 which meshes with a gear 33 to which is attached an indexing plate or dial 33a, which shows, in terms of pipe diameters, the helical angle of the setting. A threaded rod 34 controls the location of the rollers, and by means of this rod the in and out position of the rollers may be varied.

I have found it advisable to drive one set at least of the seaming rollers. The tremendous pushing force necessary to bend or form the corrugated strip and seam the pipe makes control of the horizontal position of the seam very difficult and may put such a load on the forming rods that they mark and scratch the pipe objectionably. In practice, driving the seaming rollers and controlling their speed as a function of the main driving motor 25, obviates these difficulties.

I have illustrated in the drawings means for driving the last set of forming rollers. Referring to Fig. 9 the holder for the roller 39 used for this fourth forming operation is somewhat similar to the holder above described for the first operation. Here the member 28 has rotatably mounted therein a solid cylindrical member 29a having a bifurcated outer end 29b with bearings 29c, within which bearings a drive shaft 39a is journaled. Shaft 39a may be keyed as at 39b or otherwise secured to the roller 39. Referring to Figs. 10 and 2 the shaft 39a has fixed at its other end a gear 38 driven by worm 37 through shaft 37a, gear 36 and worm 35 from a motor 13. Fastened to the member 29a by screws 29d is a housing 29e which surrounds shaft 39a and extends to the gear casing 39b, being fixed thereto. Also fixed to casing 39b an extending member 39c has an enlarged portion 39d which has threaded holes for receiving screws 39e. These screws 39e extend through arcuate slots in a flange 36b which is constructed integrally with the gear case 36a. When changing the angularity of roll 39 the parts just described will be rotated therewith about the axis of the holder member 29a, necessitating a repositioning of the motor and gear case. To provide for this the shaft 37a has a tongue and groove joint 37b which permits the motor 13 and gear case 36 to be readily removed from the machine upon removal of the screws 39e. When it is desired to change the angularity of the seaming roll, the motor and gear casing are removed and the roller is set at the required angle. Shims are then added or removed from beneath the motor and gear case to bring them to the required position and upon replacing the screws 39e the drive is again ready for operation. The member 39c may have a sideward extending arm 39h to provide rigid support of the member, said arm 39 having arcuate slots (not shown) to permit adjustability and being held by screws (not shown) to the frame of the machine wherever convenient.

The rollers 62, 63 and 65, 66, for the second and third seaming operations respectively, are flexibly mounted, in order that variations in sheet width and the like will not be forced into the seam. The flexible mounting of the rolls 61 for the first operation has already been described, but the mounting of those for the second and third operations, i. e. 62, 63, and 65, 66, is different. Referring to Figs. 2 and 4 the rollers 62 and 63 for the second operation may be mounted on the holder 9 which in turn is rotatably mounted on the rod 9'. The in and out position of the rollers is controlled by means of a threaded screw 9" the head of which engages the holder 9. In this manner a somewhat flexible mounting is provided by means of spring in the rod 9'.

Figures 17, 18:
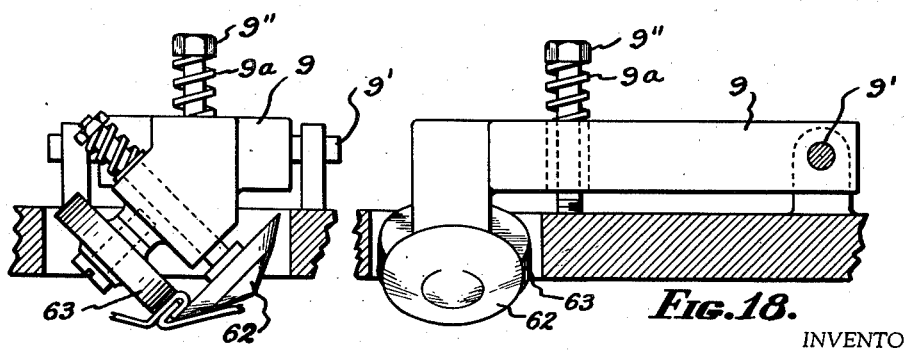
Fig. 17 is a fragmentary section through the machine showing the mounting of the rolls for the second seaming operation.
Fig. 18 is a side elevation of the rolls and mounting shown in Fig. 17, with a fragment of the frame shown in section therewith.

The mounting of these forming rollers as just described is suitable for the heavier gauge materials. When it is desired to form pipe from a lighter gauge material, a coil spring 9 may be inserted between the head of the screw 9″ and the holder 9, thus giving greater flexibility to the rolls. This manner of mounting is illustrated in Figs. 1, 17 and 18.

Figure 15:
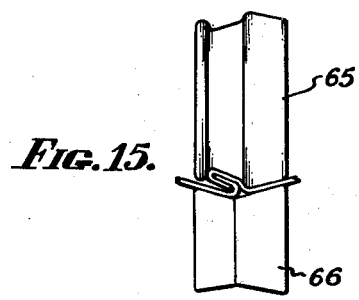

The seaming rollers 65 and 66 for the third operation, those shown in Fig. 15, are mounted as follows: Lugs 41 are mounted on the frame, and a tube 42 is rotatably mounted therebetween and carries a member 43 which is recessed to hold a circular flange 44. The roller holder 44a is affixed to this flange. In order to set the roller to the desired angle, the flange is rotated in the holder and fixed in position by means of a set screw 43a. The in and out position of the roller is controlled by means of the screw 46, passing through the hole 43b. As just described this mounting for the third forming operation will have only a slight degree of flexibility, suitable for the heavier gauge materials. It will be understood of course, that if desirable I may employ a coil spring between the head of the screw 46 and the holder 43 as previously described in connection with the second forming rollers for use on the lighter gauge materials.

It will be observed that by virtue of my novel construction, I have provided rollers to progressively form a seam, and that the mounting of the first rollers 61 is flexible, in order that imperfections in the stock shall not be forced into the seam, and that progressively each mounting is more rigid than the one preceding it, until the mounting for the last forming operation may be rigid.

Due to uneven temper in the strip or camber and perhaps, both, as mentioned hereinabove, the lock seam may wander in an axial direction with respect to the arbor. This wandering may tend to cause the rollers to move off of the seam, thereby failing to lock it.

Figure 16:
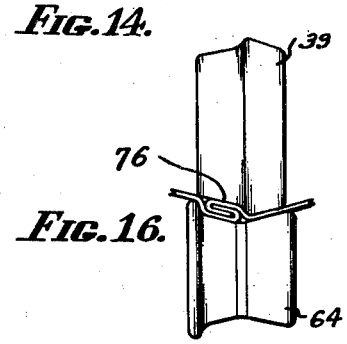
Figure 19:
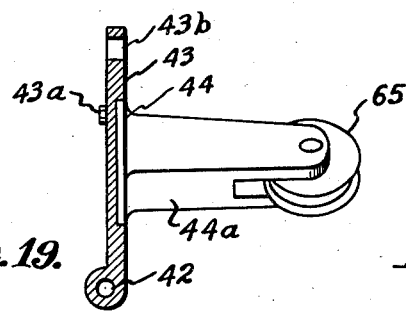
Fig. 19 is an enlarged detail view of the mounting of the outer roll used in the third seaming operation, being in side elevation and partly in section.
Figure 20:
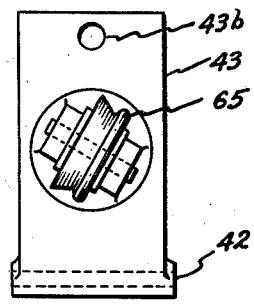
Fig. 20 is a front elevation of the same.

By balancing horizontal reaction of the holdout rollers 66 and 64, and as nearly as possible balancing the horizontal reaction of the locking rollers 65 and 39, this tendency of the rollers to move off the seam has been greatly reduced. The balancing action here referred to, is accomplished by the V shaped formation of the rollers as shown in detail in Figs. 15 and 16.

Figure 27:
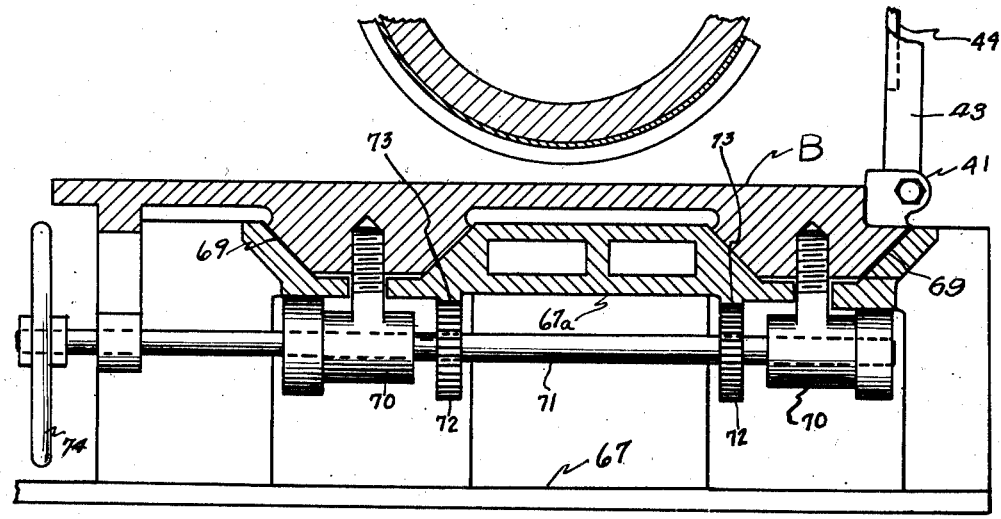
Fig. 27 is a sectional detail of a portion of the apparatus shown in Fig. 25, being taken along the line 27—27 thereon.
Figure 26:
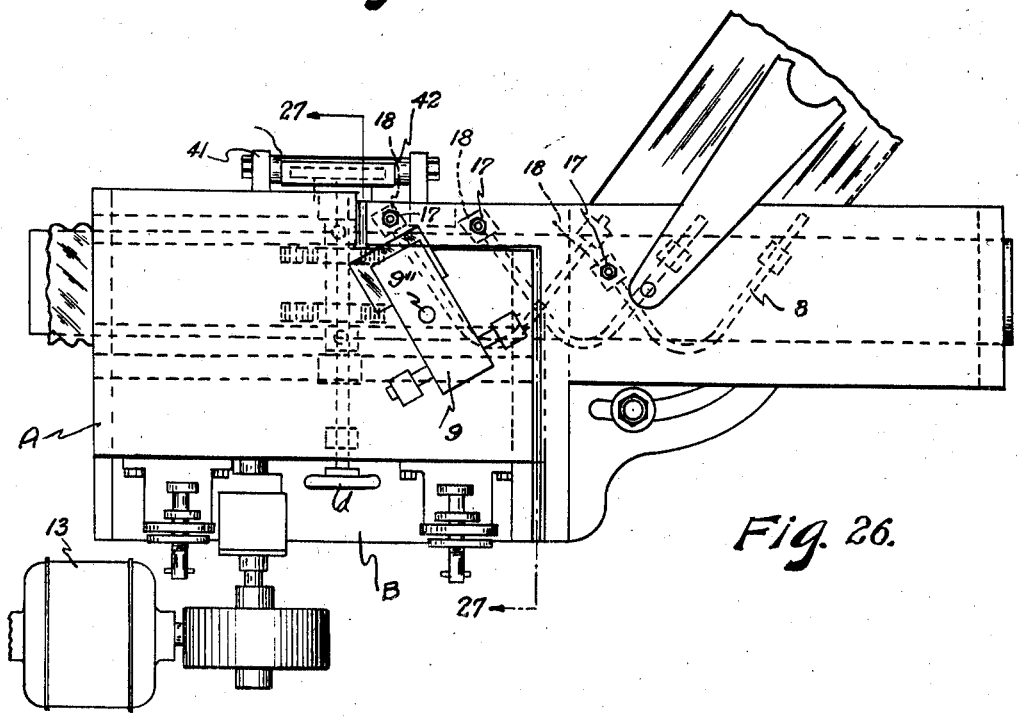
Fig. 26 is a plan view of a modified machine in which all external seam forming rollers are movable longitudinally of the pipe.

I have also pointed out means of controlling the horizontal location of the seam by a variable application of power to the rollers themselves. A further improvement may be made in the practice of my invention by allowing the rollers to travel axially with the seam by mounting them individually so as to be slidable axially of the mandrel, or by combining all of the rollers on a member which could be moved along the axis of the arbor around which the pipe is curled. Then if the seam had a tendency to wander the whole locking unit could be moved very readily with the seam. This may be done by mounting the rollers and their supporting and/or driving means to a frame slidable in the upper frame member 68. This may be accomplished as shown in Figures 26 and 27 by providing upper and lower supplementary frame members which are movable with respect to the main swinging frame member of the forming assembly, and by making the supplementary frame members controllably slidable therein, the various forming rollers being mounted upon the supplementary frame members. In these two figures I have shown upper and lower supplementary frame members at A and B. The lower of these may be slidable in guideways 69, and may be fastened by means of studded trunnion members 70 to a shaft 71. This shaft bears gear members 72 meshing with rack members 73 upon the plate 67a. The shaft 71 is provided with a handwheel 74. As this handwheel is rotated, it will be evident that the position of plates A and B will be varied in a direction parallel with the axis of the mandrel. All of the outer seam forming rollers may be mounted on the supplementary frame comprising plates A and B instead of the frame members 68 as heretofore described, and may therefore be moved in unison longitudinally of the pipe being formed.

In the practice of my invention, as heretofore indicated I avoid those difficulties due to a binding of the stock on the mandrel and the necessity of intermittent operation, by bending up the stock into helical form by thrusting it against external forming devices, namely, the helical forming rods which have been described. Nevertheless, in order to avoid too great friction against an external forming means, I have found, as I have indicated, that it is advisable to drive one or more of the final sets of seam forming rollers. This driving of the rollers has a slight tendency to contract the pipe; and while it does not make any observable difference in the final pipe diameter, yet it is sufficient not only to relieve a good deal of the friction upon the helical forming rods, but also to assist in setting the seams tightly. The combination of these features, so far as I know, is wholly novel, and is believed by me to be one of the primary reasons why I have succeeded in actual practice in forming pipe of the character herein described in a continuous commercial manner. The factors tending to cause improper seam formation or a wandering of the various parts of the helical strip during seam formation, may thus be nicely controlled; and I have succeeded in a machine of this type in continuously and commercially producing a commercially perfect product over a long period of time without any adjustments whatever after the initial adjustments have been made.

Figure 21:
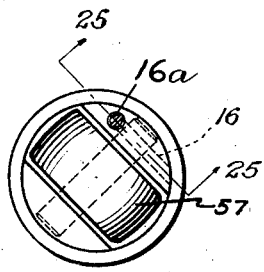
Fig. 21 is a perspective view of a fragment of the pipe or culvert formed by my method and apparatus.

I have illustrated in Figure 21 a portion of my product at 75, the seam being indicated at 76.

It may in some installations be advisable to drive more than one of the sets of seam forming rollers. Especially where more than one set is to be so driven, I have found the use of air turbine motors to be of advantage, inasmuch as these motors may be small in size and may be mounted flexibly so as not only to drive the seam forming rollers, but also to permit resilient motion therein for the purposes hereinabove described. These turbine motors are preferably of high speed, and have built-in gear reduction boxes to reduce the speed and increase the power to the desired degree. Another advantage of such motors is that they are elastic in operation so that their speed will vary in proportion to power requirements, and will, to all intents and purposes, automatically adjust itself to the particular seam forming needs. It is preferable when using such motors, to employ a starting and stopping controller for the machine, which not only includes a switching device for the main drive motor 25, but also one or more valves for the turbine motor of motors.

I have illustrated a driving means of this character in Fig. 11. Here the air supplied through the flexible tube 90 passes through jet 91 to drive the turbine wheel 92 mounted on shaft 93. A train of reducing gears is generally indicated at 94 for transmitting the power to the roller 95 fixed on shaft 96. This turbine drive may be mounted directly on the roller holder 97 by providing thereon a lug 98 through which screws 99 engage the turbine casing 100.

In setting up my machine, the stock is started through the corrugating rolls, and each set of seam forming rollers is set up progressively as the stock passes around the arbor, until all have been set up. From this point on, production is automatic. Continuity of pipe production is maintained by welding the beginning of a new coil of skelp onto the tail end of a preceding coil, just preceding its entrance into the corrugator.

In Figure 3 I have shown a wiring diagram for the driving motors. The main motor 25 is compound wound and has a shunt field 26 and a series field 27. The motor 13, which is series wound, is connected in series with the motor 25. A switch 78 is provided for shorting out the motor 13 while starting the material through the machine.

Of course, different thicknesses of stock, within limits of reason, may be used on my machine, the helical rods being adjusted with respect to the mandrel in accordance with the thickness or gauge of stock used. It is within the scope of my invention to form smooth walled pipe on my machine, by simply substituting a flat band for the helical rods. The rolls 4 will be replaced by pinch rolls, and the strip will be forced upwardly around the mandrel against the flat forming band which replaces the helical forming rods 8. The seams will be formed and set as before, and the machine in other respects will not have to be altered. Helical rods may be used for forming smooth walled pipe, but the flat band should not be used for forming corrugated pipe, as the band will tend to flatten the corrugations as the stock passes around the arbor.

It is to be understood that different forms of my preferred embodiment may be made without departing from the spirit of my invention.

Having now in detail described my method, and my machine adapted to carry out that method, what I claim as new and desire to secure by Letters Patent, is:—

1. In a machine for forming helical lock seam pipe, means for feeding stripsheets, means for forming a U shaped bead along one edge of the sheet, and an L shaped flange along the other, a stationary mandrel angularly disposed with respect to the path of the sheet, means to guide the sheet around the said mandrel, means to guide the said flange into the said bead, whereby a seam is formed running helically around the formed pipe, means to compress the seam, and progressive means to incline the seam, and means to press the seam solidly home against the formed pipe, said seam forming means being movable axially of said mandrel to compensate for variability in the location of said seam.

2. In a machine for forming helical lock seam pipe, means to feed stripsheets, means for forming a U shaped bead along one edge of the sheet and an L shaped flange along the other, a mandrel angularly disposed with respect to the direction of travel of the sheet, means to guide the said flange into the said bead thereby forming a seam running helically around the outside of the formed pipe, resilient means for compressing the said seam, slightly less resilient means for partially inclining said seam, relatively rigid means for completely inclining the seam, and rigid means for pressing the seam solidly home against the formed pipe.

3. In a machine for forming helical lock seam pipe, means to feed stripsheets, means for forming a U shaped bead along one edge of the sheet and an L shaped flange along the other, a mandrel angularly disposed with respect to the direction of travel of the sheet, means to guide the said flange into the said bead thereby forming a seam running helically around the outside of the formed pipe, resilient means for compressing the said seam, slightly less resilient means for partially inclining said seams, relatively rigid means for completely inclining the seam, and rigid means for pressing the seam solidly home against the formed pipe, said seam forming means being movable axially of said mandrel to compensate for variability in the location of said seam.

4. In a machine for forming corrugated helical lock seam pipe, a plurality of pairs of corrugating rolls, the first pair having but one central corrugation, and succeeding pairs having additional corrugations equal in number on each side of the central corrugation, and the last pair having a complete number of corrugations for the width of sheet being formed, means for producing a downwardly depending flange along one edge of the sheet, and means to produce a downwardly depending U shaped bead along the other, a mandrel angularly disposed with respect to the path of the stock, means to guide the stock around the mandrel from beneath and associated means to guide the said flange into the said bead thereby forming an upstanding seam running helically around the outside of the formed pipe, means to tightly compress the said seam, means to incline the seam, and means to set the seam solidly against the formed pipe.

5. In a machine for forming corrugated helical lock seam pipe, a plurality of pairs of corrugating rolls, the first pair having but one central corrugation, and succeeding pairs having additional corrugations equal in number on each side of the central corrugation, and the last pair having a complete number of corrugations for the width of sheet being formed, means for producing a downwardly depending flange along one edge of the sheet, and means to produce a downwardly depending U shaped bead along the other, a mandrel angularly disposed with respect to the path of the stock, means to guide the stock around the mandrel from beneath and associated means to guide the said flange into the said bead thereby forming an upstanding seam running helically around the outside of the formed pipe, means to tightly compress the said seam, means to incline the seam, means to set the seam solidly against the formed pipe and means for applying driving power to said last mentioned means.

6. In a machine for forming corrugated helical lock seam pipe, a plurality of pairs of corrugating rolls, the first pair having but one central corrugation, and succeeding pairs having additional corrugations equal in number on each side of the central corrugation, and the last pair having a complete number of corrugations for the width of sheet being formed, means for producing a flange along one edge of the sheet, and means to produce a U shaped bead along the other, a mandrel angularly disposed with respect to the path of the stock, means to guide the stock around the mandrel and associated means to guide the said flange into the said bead thereby forming an upstanding seam running helically around the outside of the formed pipe, resilient means to tightly compress the said seam, less resilient means to partially incline the seam, fairly rigid means to completely incline the seam, and rigid means for setting the seam solidly home against the formed pipe.

7. In a machine for forming corrugated helical lock seam pipe, a plurality of pairs of corrugating rolls the first pair having but one central corrugation, and succeeding pairs having additional corrugations equal in number on each side of the central corrugation, and the last pair having a complete number of corrugations for the width of sheet being formed, means for producing a flange along one edge of the sheet, and means to produce a U shaped bead along the other, a mandrel angularly disposed with respect to the path of the stock, means to guide the stock around the mandrel and associated means to guide the said flange into the said bead thereby forming an upstanding seam running helically around the outside of the formed pipe, resilient means to tightly compress the said seam, less resilient means to partially incline the seam, fairly rigid means to completely incline the seam, and rigid means for setting the seam solidly home against the formed pipe, and means for applying driving power to said last mentioned means.

8. In a spiral pipe machine a mandrel, mountings in said mandrel, and holdout rollers mounted in said mountings, said mountings being rotatable in said mandrel to permit variation of the inclination of said holdout rollers to the axis of said mandrel.

9. In a spiral pipe machine a mandrel, and hold-out rollers in said mandrel, said hold-out rollers being rotatable also in the plane of their axes, and external seam forming and locking rolls and mountings therefor, some at least of said rolls being freely movable to vary their inclination to the helical seam automatically, and movable longitudinally to compensate for varying axial locations of the seam.

10. In a machine for forming rigid corrugated helical pipe, means for forming longitudinal corrugations in a strip of material and for feeding said strip in a longitudinal direction, means formed with a plurality of helical rails positioned in the path of said strip to interengage with certain of the longitudinal corrugations formed in said strip and thereby to guide and form said strip as it is fed forward into a helical shape and with its opposite edges adjacent each other, and means to seal said edges together.

11. In a machine for forming rigid corrugated helical pipe, means for forming longitudinal corrugations in a strip of material and for feeding the said strip in a longitudinal direction, means formed with a plurality of helically arranged guide members positioned in the path of said strip to interengage with some at least of the longitudinal corrugations formed in said strip and thereby to guide and form said strip as it is fed forward into a helical shape with its opposite edges adjacent each other, and means to seal said edges together.

12. In a machine for forming rigid corrugated helical pipe, means for feeding a longitudinally corrugated strip of material in a longitudinal direction, means formed with a plurality of helically arranged guide members positioned in the path of said strip to interengage with certain of the longitudinal corrugations formed in said strip and thereby to guide and form said strip as it is fed forward into a helical shape with its opposite edges adjacent each other, and means to seal said edges together.

13. In a machine of the class described, corrugating means, means for feeding a corrugated strip longitudinally forward under power, external forming means therefor to cause said strip to assume a helical form, seaming means and a power drive for said seaming means so as to impart a power forced rotative movement to the helix beyond the forming means to relieve strain thereon.

14. In a machine of the class described, corrugating means, means for feeding a corrugated strip longitudinally forward under power, external forming means therefor to cause said strip to assume a helical form, seaming means and a power drive for said seaming means so as to impart a power forced rotative movement to the helix beyond the forming means to relieve strain thereon, and a mandrel inside said helix, said mandrel having abutment means against which said power forced seaming means forces said helix.

15. In a machine for forming helical lock seam pipe, means for feeding strip sheets, means for forming a flange along one edge of the sheet and a U-shaped bead along the other, a stationary mandrel angularly disposed with respect to the path of the sheet, external forming means associated with said mandrel, means to feed the sheet around the mandrel against said forming means to cause it to assume a helical shape by virtue of its contact with said external means, and associated means to guide the said flange into the said bead forming an upstanding seam running helically around the outside of the formed pipe, means to tightly compress the said seam, successive means to incline the seam, means to solidly set the seam along the formed pipe, and means for applying driving power to said last-mentioned means to slightly contract said pipe and to relieve strain on said external forming means, and assist in setting said seam tightly.

16. In a spiral pipe machine, a mandrel, external seam forming and locking rolls, rotatably mounted housings, some at least of said rolls being mounted in said rotatably mounted housings, whereby said rolls may vary their inclination in accordance with variations in the inclination of the helical seam automatically.

17. In a machine of the class described, a stationary mandrel, fixed external forming means spaced therefrom, and means for feeding a strip of material forward under power, into said space and against said external forming means at an angle to the axis of said mandrel whereby to form said strip into a helix with interlocking edges, and means for imparting a power forced rotative movement to the helix beyond said forming means whereby to slightly contract said helix, relieve strain on said forming means, and assist in setting said seam tightly.

18. A process of forming helical pipe which comprises forming cooperative seam elements on said strip, thrusting it forward under power into external forming means set at an angle to the direction of movement of said strip so as to give said strip a helical form by contact of said strip with said external forming means, causing said seam elements to interengage, locking said seam elements, and while locking said seam elements imparting to said pipe a rotating movement beyond said forming means so as to slightly contract said pipe and to relieve strain on said forming means.

JONATHAN ROY FREEZE.